Sept. 25, 1962 L. HUNTER 3,055,264
MIRROR MOUNT FOR WHEEL ALIGNMENT APPARATUS
Filed Nov. 6, 1959 2 Sheets-Sheet 2

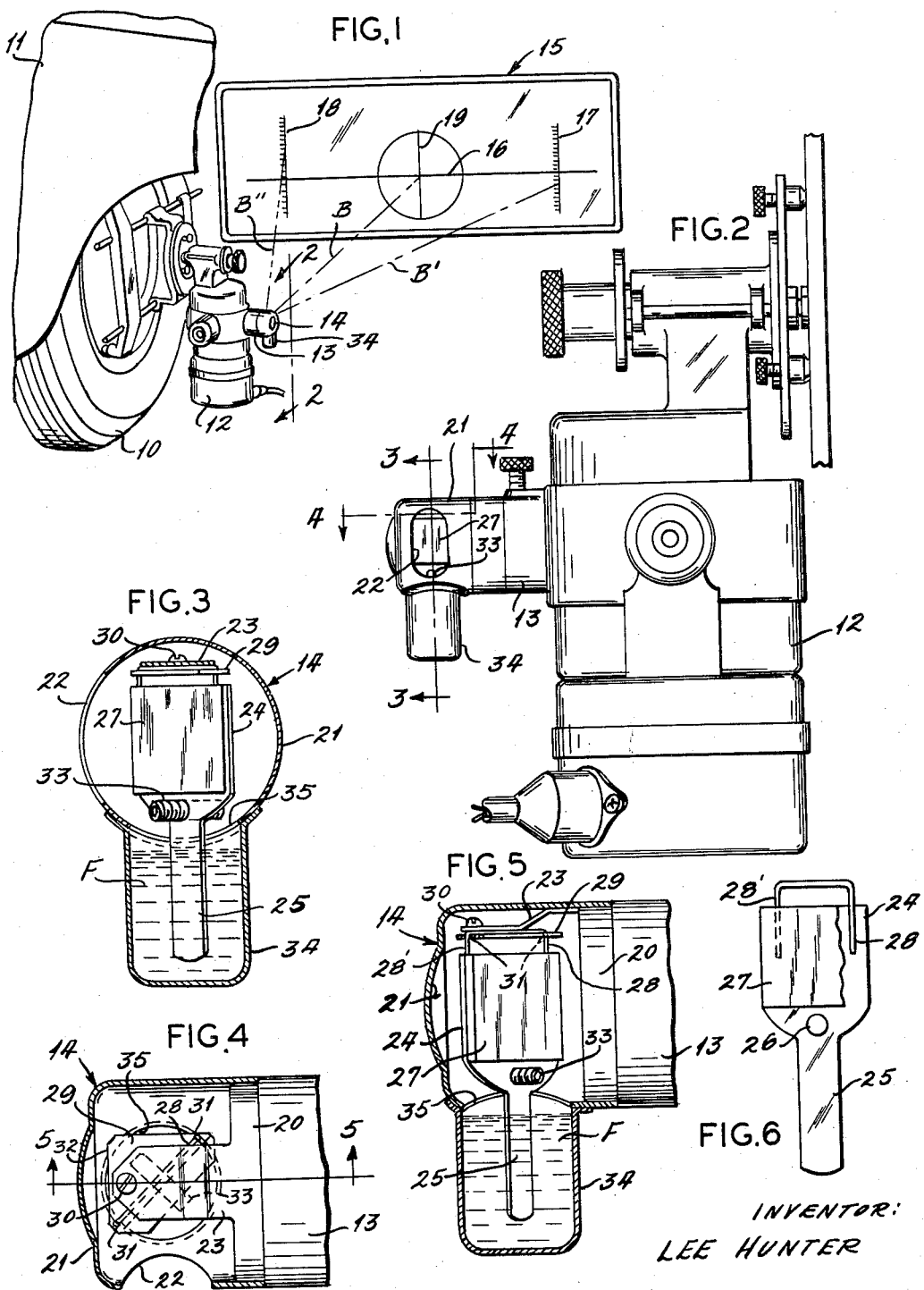

INVENTOR
LEE HUNTER
By Gravely, Lieder & Woodruff
ATTORNEYS.

United States Patent Office 3,055,264
Patented Sept. 25, 1962

3,055,264
MIRROR MOUNT FOR WHEEL ALIGNMENT APPARATUS
Lee Hunter, Rte. 1, Box 136, Creve Coeur, Mo.
Filed Nov. 6, 1959, Ser. No. 851,425
3 Claims. (Cl. 88—14)

This invention relates to improvements in wheel alignment apparatus and particularly to a novel arrangement for mounting a mirror device in the light beam projector of such apparatus.

This application is a continuation-in-part of a copending application filed by me on November 28, 1958, bearing Serial No. 776,810, now abandoned.

An object of this invention is to provide a light beam projecting mirror for wheel alignment apparatus to make it easier and faster in obtaining certain wheel alignment readings.

Another object of the invention is to provide a simple and substantially frictionless mounting for a light beam projecting mirror and to embody means for damping mirror motion which would otherwise interfere with the speed and accuracy of the alignment operation in which the mirror is employed.

Other objects of the present invention will be pointed out or will appear from the following description of a preferred embodiment.

Briefly, the form of the invention chosen for purposes of this disclosure consists in a mirror suspended or carried by a light beam projector unit in a substantially frictionless manner so that the swinging of the projector unit with the wheel during alignment operations will not disturb the desired position of the mirror. The invention further consists in employing a pendulum mirror carrier provided with an adjustable weight and an extension thereon adapted to cooperate with motion damping media, whereby swinging displacement of the wheel to obtain alignment readings on a remote chart will not cause the light beam to oscillate during the alignment operations.

The present invention is employed in connection with the caster measuring phase of the wheel alignment operation, but this is not to be taken as limiting the uses thereof in connection with other wheel alignment operations. By way of example, therefore, the improvements to be hereinafter described and claimed are shown in the accompanying drawings, wherein:

FIG. 1 is a fragmentary perspective view of a vehicle showing the right front wheel on which a light beam projector unit is mounted to direct a crossed beam of light upon a remote chart so that the caster or tilt of the wheel king pin may be determined upon turning or swinging the wheel and projector unit, the projector unit being provided with the present mirror mounting improvement;

FIG. 2 is an elevational view of the projector unit from the front to show the mirror mounting arrangement, the view being taken at line 2—2 of FIG. 1;

FIG. 3 is a sectional elevational view taken at line 3—3 in FIG. 2;

FIG. 4 is a fragmentary plan view, partly in section, taken at line 4—4 in FIG. 2;

FIG. 5 is an enlarged and fragmentary sectional elevational view of the improved mirror mounting arrangement;

FIG. 6 is a face view of the mirror and carrier therefor, the mirror being broken away to show the carrier;

Figure 7:
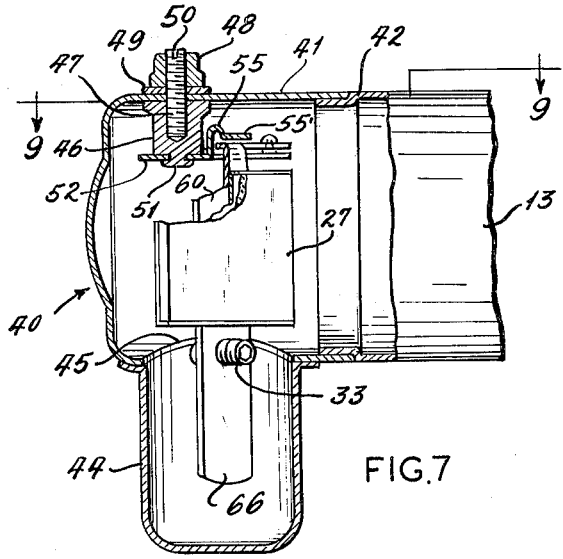
FIG. 7 is a fragmentary sectional view of a modified mounting device for a mirror.

In the drawings, FIG. 1 illustrates the set-up of the wheel alignment apparatus for determining the caster of the right front wheel 10 of the vehicle shown in fragmentary part at 11. The apparatus includes the projector unit 12 having the lens barrel 13 and the light beam projecting mirror device 14 which directs a light beam B upon a remote chart 15 provided with a zero and level line 16 extending horizontally. The chart also is provided with a vertical index line 17 for the outside 20° turn of the wheel 10, and with a second vertical index line 18 for the inside 20° turn of the wheel. Each vertical index line 17 and 18 is provided with indicia for determining the degrees of positive and negative caster. For example the indicia on line 17 above the level line 16 gives degrees of negative caster and that below line 16 degrees of positive caster. On line 18 the indicia above the level line indicates degrees of positive caster and that below line 16 degrees of negative caster. A similar chart (not shown) for the left front wheel is provided with the same set of index lines and caster indicia, but these would be exactly reversed in position and as to positive and negative values.

It is, of course, understood that caster of the wheel 10 has to do with the tilt of the king pin fore and aft of a vertical line through the axis of wheel rotation. Thus, when the king pin has a tilt backwardly relative to the front of the vehicle 11 the caster is said to be positive. Also, the positive caster of the wheel will cause the light beam B to move downwardly from the level starting attitude to the outward depressed beam B′ for a 20° outward turn, and will raise the beam to the elevated position B″ for a 20° inward turn. The caster measurement can be rapidly and easily followed by projecting a crossed light beam from the lens barrel 13 in which the beam B in the straight ahead wheel position has its vertical and horizontal crossed filaments adjusted to coincide with the zero and level line 16 and the center vertical index line 19. In prior apparatus the projected crossed filaments of the light beam oscillate during the wheel turn because of the angular rise or fall of the wheel during the turning movement about the tilted king pin axis. As a consequence, the light beam takes some time to quiet down and stop oscillating. The present mirror device overcomes this difficulty and is more easily adjusted with the beam always remaining in a substantially steady condition due to the provision of the damping means or dash pot.

The mirror device 14 is shown to advantage in FIGS. 2 to 6 inclusive, and reference will now be made to these views of the drawings. The projector unit 12 is a known device and need not be described in detail, since its function is to create a crossed filament light beam which is magnified in the lens barrel 13 to an intensity suitable for projection over the required distance to the remote chart 15. The barrel 13 has a reduced diameter shoulder 20 to snugly receive a removable cap 21 formed with a window opening 22 in one side facing the chart 15. The cap protectively houses a bracket 23 fixed on the barrel 13 at a position above the opening 22. The mirror device comprises a backing member 24 (FIG. 6) having an extension element 25 thereon and a threaded aperture 26. A mirror 27 is firmly affixed to the member 24, and a suspension thread 28 is placed between the backing member 24 and the mirror 27 so that a loop 28′ is formed at the upper end. An attachment plate 29 is engaged in tme loop 28′ and a screw 30 is used to secure the plate 29 to the bracket 23 with the thread loop 28′ clamped between the parts.

One way to construct the foregoing is to pass the loop

28' of the suspension thread 28 through small apertures 31 in the plate 29 (FIG. 4), and to locate the apertures 31 at a 45° angle to the end margin 32 of the plate. When constructed in this manner, the plate 29 may be turned to either of two positions for directing the light beam B as shown in FIG. 1, or for directing the beam 180° to that in FIG. 1 when the unit 12 is applied to the left wheel (not shown). As was pointed out above, the mirror 27 is suspended in a substantially frictionless manner through the thread 28 and is free to hang in a pendular state. A small threaded counterweight 33 is inserted in aperture 26 of the member 24 to provide the necessary adjustment for compensating the off-center mass of the mirror 27 and backing member 24 to bring it to a true pendular attitude within the housing cap 21 and to assure correct projection of the light beam through the window 22.

While the mirror 24 is accurately suspended in the manner described it is very sensitive to vibration and movement of the unit 12 and will swing for a long time if not checked. A simple oscillation damper for the mirror comprises the extension 25 which is immersed in a fluid F contained in a cup 34 secured to the lower side of the cap 21 at opening 35. The fluid may be, by preference, a non-evaporative liquid like any of the available permanent anti-freeze compounds. The fluid acts on the extension 25 to dampen oscillations of the mirror without creating friction so that the turning of the wheel 10 will not result in prolonged mirror oscillations and the light beams B' and B'' will hold substantially steady and true on the chart 15.

Turning to FIGS. 7 to 10, the light beam projecting mirror device 40 is similar in function to the device 14, but differs in certain structural features. The mirror 27 in this modified device is carried by the removable cap 41 which has a slip-fit over a collar 42 carried by the lens barrel 13 of the projector unit 12. The cap 41 has the opening 43 in one side through which the light beam may be directed as desired. A fluid containing dash pot 44 is attached to the cap by a flange surrounding a bottom opening 45 in the cap.

The device 40 supports the mirror 27 upon substantially frictionless means, and the mirror may be angularly adjusted as desired. To accomplish these advantages, the cap 40 supports a spacer 46 by having a threaded element 47 engage in the spacer and project outwardly of the cap to be engaged by a holding nut 48. The nut 48 abuts a friction element or washer 49 so that the nut 48 and element 47 move together and turn the spacer 46 within the cap 40. The turning may be carried out by inserting a tool in the opening 50. The turning may be to either side of the approximately 45° position shown in FIGS. 7 and 9. The turning axis is in the threaded element 47 which, in turn, lies on the center line of the lens barrel 13.

Figure 9:
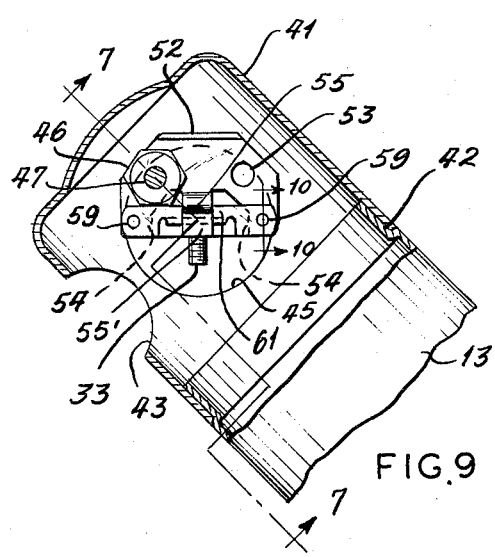
FIG. 9 is a top plan view, partly in section, of the device seen at line 9—9 in FIG. 7.
Figure 10:
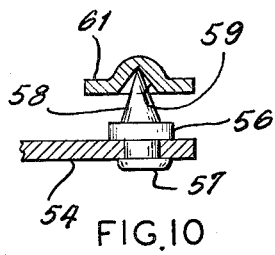
FIG. 10 is a greatly enlarged detailed sectional view of a substantially frictionless pivot mount and support for the mirror support.

The spacer 46 has a rivet end 51 which secures a support bracket 52 within the cap 40. Since the devices are left or right hand in operation, the bracket 52 is formed with a pair of apertures 53 (one being shown in FIG. 9) so that it can be mounted on the spacer, either as shown in FIG. 9, or 90° to that position by inserting the rivet end 51 in the aperture 53 which is exposed to the right of the spacer 46. The bracket 52 is a plate member having spaced fingers 54 which extend outwardly on either side of a central prong 55 which extends above the plane of the bracket, as will be noted presently. The fingers 54 each carry a pivot fulcrum 56, as shown in FIG. 10. The fulcrum 56 is riveted at 57 in the aperture of the bracket finger and has its conical point 58 free to cooperate with a conical socket 59 in the mirror support.

Figure 8:
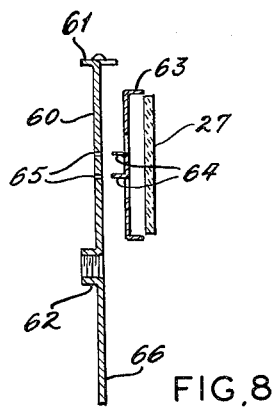
FIG. 8 is an exploded sectional view of the mirror support for the device of FIG. 7.

The mirror support, FIGS. 7, 8 and 9, includes a member 60 formed of strip material and stamped out so that its upper end provides a cross head 61 which extends outwardly at either side to overlap (FIG. 9) the fingers 54 of the bracket 52. Each end of the cross head 61 contains a conical socket 59. The member 60, thereby, depends from the fulcrums 56 and the cross head 61 is prevented from disengaging the fulcrums 56 by the hold down prong 55 which has its flat end 55' positioned over the central part of the cross head 61. The remainder of the member hangs on the fulcrums 56 and can be adjusted by the threaded counterweight 33 in the socket 62. The mirror 27 is, in this device, suitably cemented in a frame 63. The rear of the frame has a pair of bendable prongs 64 stamped therefrom to match with slits 65 punched in the member 60. The lower end or extension element 66 of the member 60 extends into the dash-pot 44 where it is immersed in the fluid therein and dampens the oscillations of the mirror, and brings the mirror to a steady condition in a very short time.

In connection with the operation of the device of FIG. 5 or the device of FIG. 7, it is understood that either device may be used in the light beam projector set up shown in FIG. 1. During the movement of the vehicle wheel 10, the projector 12 also moves and such motion causes the pendulously suspended mirror 27 to swing or oscillate on its substantially frictionless support. The mirror oscillation must be stopped before an accurate reading can be obtained on the chart 15, and this is accomplished by the provision of the extension element 25 (FIG. 5) or element 66 (FIG. 7) projecting into the damping fluid contained in the dash pot 34 or 44 respectively. The damping fluid in contact with such elements materially shortens the time needed to stop mirror oscillation and, therefore, bring the reflected light beam to a stabilized state of rest upon the chart 15. An average vehicle wheel 10 has sufficient weight to require some force thereon to swing it through the necessary turning arc to determine the caster conditions. This turning effort is usually applied at the wheel 10 so that violent mirror oscillations are generated, but the damping fluid stabilizes this adverse condition and makes it possible to steady the light beam during the turn so that its path is well defined as it moves over the chart 15.

It is believed that the characteristics of the mirror devices 14 or 40 and the manner of the application thereof to wheel alignment apparatus will be understoood from the foregoing description. The provision of a frictionless and oscillation damped mirror device in light beam projectors for wheel alignment apparatus is believed to be new and novel, and the efficient and accurate results attained thereby greatly improve the apparatus. The simple construction of the device is desirable and the features of adjustment add greatly to its utility. Furthermore, the device overcomes the difficulty of prior apparatus in which the crossed filaments of light beams turn or rotate during wheel alignment operations.

While one embodiment of the present invention has been illustrated and described by way of example only, it will be understood that various changes may be made. However, it is the intent to include all equivalent means and constructions within the scope of the appended claims.

What is claimed is:

1. In a light beam projector for wheel alignment apparatus having an outlet for a light beam the improvement of means disposing a light beam reflecting mirror in the axis of and before the projector outlet so as to turn the light beam at an angle to the axis of the projector outlet, said means comprising: a housing carried on the projector at the light beam outlet, said housing having a window out of line with the axis of the projector light beam outlet; means in said housing forming a support located above said housing window and above the axis of a light beam from the projector outlet; a light reflecting mirror in said housing with its reflecting surface in the axis of the light beam and angularly turned to be visible through said housing window; bracket means attached to said support means; substantially frictionless means connecting said mirror to said bracket means for substantially free swinging pendular movement in all directions, the mirror directing a light beam through said housing window; and means to damp mirror swing including a fluid containing member adjacent said housing and an element extending from said mirror into said fluid containing member.

2. The improvement set forth in claim 1 wherein said bracket is formed with a fulcrum point and said frictionless means connecting said mirror to said bracket means is a socket freely engaged with said fulcrum point.

3. In a light beam projector for wheel alignment apparatus having an outlet for a light beam the improvement of means disposing a light beam reflecting mirror in the axis of and before the projector outlet so as to turn the light beam at an angle to the axis of the projector outlet, said means comprising: a housing carried on the projector at the light beam outlet, said housing having a window out of line with the axis of the projector light beam outlet; a device in said housing forming a support located above said housing window and above the axis of a light beam from the projector outlet; a bracket mounted on said device and formed with a bendable element and spaced projections each providing point support means; a light reflecting mirror in said housing with its reflecting surface in the axis of the light beam and angularly turned to direct the light through said window; mirror mounting means having spaced socket means thereon complementary to said point support means and engaged thereon to substantially frictionlessly carry said mirror for freedom of pendular motion, said mirror mounting means being retained in position by said bendable element being positioned to loosely retain said socket means and point support means in engagement; and means to damp mirror pendular swing including a fluid containing member adjacent said housing and an element extending from said mirror mounting means into said fluid containing member.

References Cited in the file of this patent

UNITED STATES PATENTS

| | | |
|---|---|---|
| 1,722,209 | Gordon | July 23, 1929 |
| 1,891,641 | Habel | Dec. 20, 1932 |
| 2,347,702 | Maris | May 2, 1944 |
| 2,700,319 | Carr | Jan. 25, 1955 |
| 2,843,001 | Werner | July 15, 1958 |